(12) United States Patent
Chang

(10) Patent No.: US 10,183,415 B2
(45) Date of Patent: Jan. 22, 2019

(54) TABLE SAW

(71) Applicant: Chin-Chin Chang, Taichung (TW)

(72) Inventor: Chin-Chin Chang, Taichung (TW)

( * ) Notice: Subject to any disclaimer, the term of this patent is extended or adjusted under 35 U.S.C. 154(b) by 0 days.

(21) Appl. No.: 15/455,136

(22) Filed: Mar. 10, 2017

(65) Prior Publication Data

US 2018/0257254 A1    Sep. 13, 2018

(51) Int. Cl.
*B27B 27/02* (2006.01)
*B27B 27/10* (2006.01)
*B23D 47/02* (2006.01)

(52) U.S. Cl.
CPC ............ *B27B 27/10* (2013.01); *B23D 47/025* (2013.01); *B27B 27/02* (2013.01)

(58) Field of Classification Search
CPC ......... B27B 27/00; B27B 27/02; B27B 27/04; B27B 27/06; B27B 27/08; B27B 27/10; B27B 5/16; B27B 5/181; B27B 5/22; B27B 5/222; B23D 47/025; B23D 47/04; B23D 47/045; B27G 19/02; Y10T 83/773; Y10T 83/727; Y10T 83/7647; Y10T 83/73; Y10T 83/732; Y10T 83/734; Y10T 83/7722; Y10T 83/7684; Y10T 83/7705; F16B 41/00; F16B 41/002; F16B 39/022; F16B 39/028

USPC .................................. 144/286.5, 287, 286.1
See application file for complete search history.

(56) References Cited

U.S. PATENT DOCUMENTS

| | | | | |
|---|---|---|---|---|
| 4,252,239 A | * | 2/1981 | Snyder | B23D 57/0092 144/285 |
| 5,845,555 A | * | 12/1998 | Dawley | B23Q 16/006 83/467.1 |
| 2002/0134212 A1 | * | 9/2002 | Ceroll | B23Q 3/007 83/438 |

* cited by examiner

*Primary Examiner* — Evan Macfarlane

(57) ABSTRACT

A table saw includes a table, a saw, a track, a slide strip, and a fence member. The table has an axial direction and a radial direction which are orthogonal to each other. The saw is arranged at a predetermined position of the table. The track is arranged at each side of the table. The slide strip is slidably engaged with the track. An outer surface of the slide strip opposite to the track has a first position part, a second position part, and a third position part. The first position part and the second position part are respectively arranged at two ends of the slide strip and the third position part is arranged at a center of the slide strip. The fence member is bridged on the table and secured to one of the first position part, the second position part, and the third position part.

2 Claims, 14 Drawing Sheets

TABLE SAW

FIELD OF THE INVENTION

The present invention relates to a table saw, and more particularly to a table saw capable for fixing the fence member more stable and making the precision for cutting and sizing much better.

BACKGROUND OF THE INVENTION

Please refer to FIGS. 1 to 3, the slide member 2' of the conventional table saw 100' has a center slot 21' and a lower rack 22'. A fixing bolt 1' is releaseably arranged at the center slot 21'. It means that the fixing bolt 1' is fixed to the slide member 2' while the fixing bolt 1' is screwed in the center slot 21' and the fixing bolt 1' is movable while the fixing bolt 1' is screwed out the center slot 21'. The fence member 3' of the conventional member 100' is locked to the slide member 2' and limited by the fixing bolt 1'.

Because the bottom end of the fixing bolt 1' is abutted against the inner wall of the center slot 21' while the fixing bolt 1' is screwed in the center slot 21', the fixing bolt 1' may be swung or vibrated. Therefore, the fence member 3' which is locked to the slide member 2' and limited by the fixing bolt 1' is unstable to make the precision for cutting and sizing worse while cutting and sizing the work piece (not shown).

Additionally, a gear 4' is engaged with the lower rack 22' and the slide member 2' may be slid by rotating the gear 4'. But while cutting and sizing, the lower rack 22' may slide to drive the gear 4' to rotate to influence operation of cutting and sizing. And the precision of cutting and sizing is hard to control and improve.

In view of the foregoing circumstances, the inventor has invested a lot of time to study the relevant knowledge, compare the pros and cons, research and develop related products. After quite many expetireents and tests, the "table saw" of this invention is eventually launched to improve the foregoing shortcomings, to meet the public use.

SUMMARY OF THE INVENTION

An object of this invention is providing a table saw. The fence member may be lockably fixed at the first position part, the second position part, or the third position part of the slide strip so as to cut and size the work piece. The free bolt covered with the bushing is limited by the two fixing bolts so that the free bolt is hard to swing or vibrate. When each groove part of the fence member is engaged with and limited by the corresponding free bolt, the fence member is stable to limit the work piece and the precision for cutting and sizing the work piece may be better.

To achieve above objects, a table saw may comprise a table, having an axial direction and a radial direction which are orthogonal to each other; a saw, arranged at a predetermined position of the table, and a cutting direction of the saw and the radial direction of the table are parallel; a track, arranged at each side of the table, an axial direction of the track and the axial direction of the table are parallel; a slide strip, slidably engaged with the track, an outer surface of the slide strip opposite to the track has a first position part, a second position part, and a third position part, the first position part and the second position part are respectively arranged at two ends of the slide strip and the third position part is arranged at a center of the slide strip; and a fence member, bridged on the table and lockably fixed at one of the first position part, the second position part, and the third position part.

In some embodiments, each of the first position part, the second position part, and the third position part includes two fixing bolts, a free bolt, and a bushing, the free bolt is arranged between the two fixing bolts and limited by the two fixing bolts, and the bushing covers on the free bolt.

In some embodiments, the fence member includes a bar part, two L-shaped locking parts, and two groove parts, the two L-shaped locking parts are respectively arranged at two ends of the bar part, each groove part is arranged adjacent to corresponding L-shaped locking part, and each L-shaped locking part is lockably fixed at the corresponding slide strip, each groove part is limited by the corresponding free bolt of one of the first position part, the second position part, and the third position part.

Further features and advantages of the present invention will become apparent to those of skill in the art in view of the detailed description of preferred embodiments which follows, when considered together with the attached drawings and claims.

BRIEF DESCRIPTION OF THE DRAWINGS

All the objects, advantages, and novel features of the invention will become more apparent from the following detailed descriptions when taken in conjunction with the accompanying drawings.

DESCRIPTION OF THE PREFERRED EMBODIMENT

Figure 1:
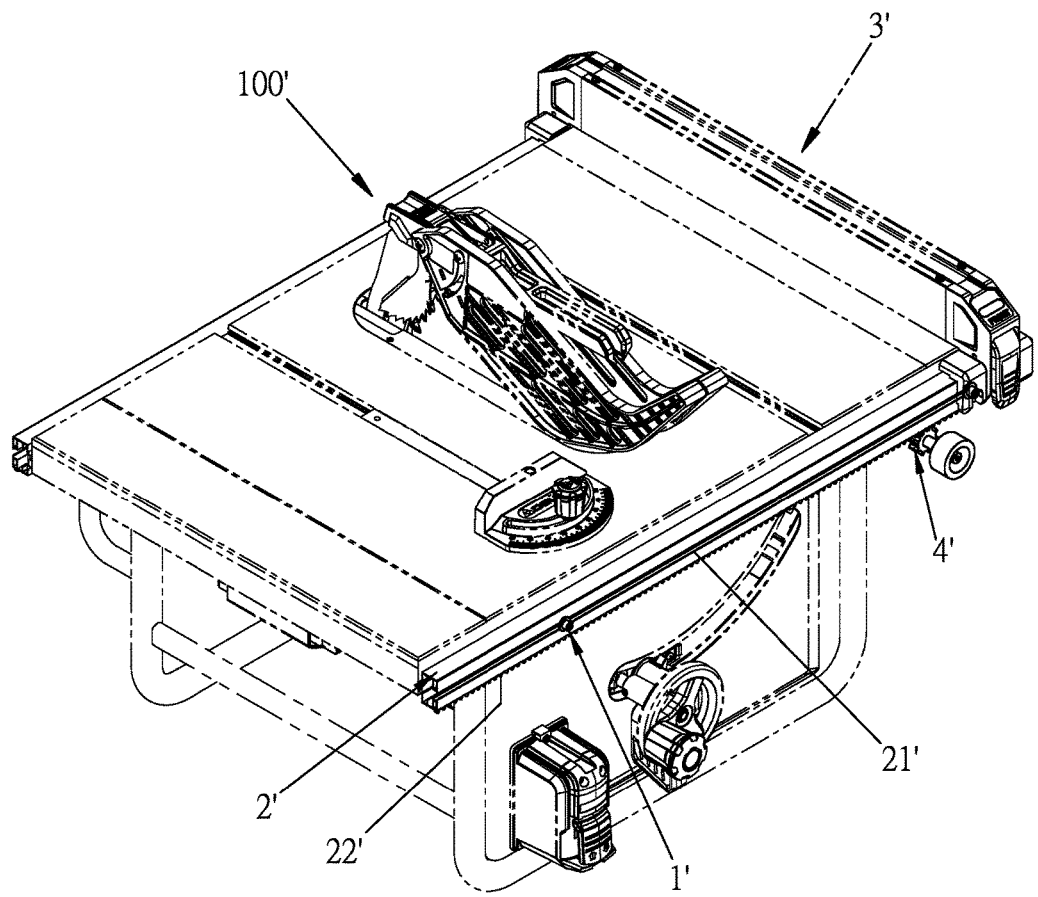
FIG. 1 is a perspective view of a conventional table saw.
Figure 2:
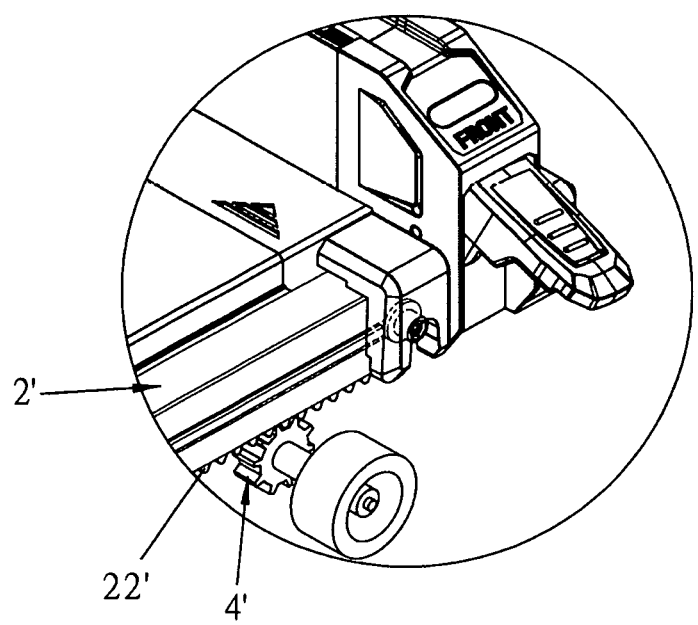
FIG. 2 is an enlarged view of the conventional table saw.
Figure 3:
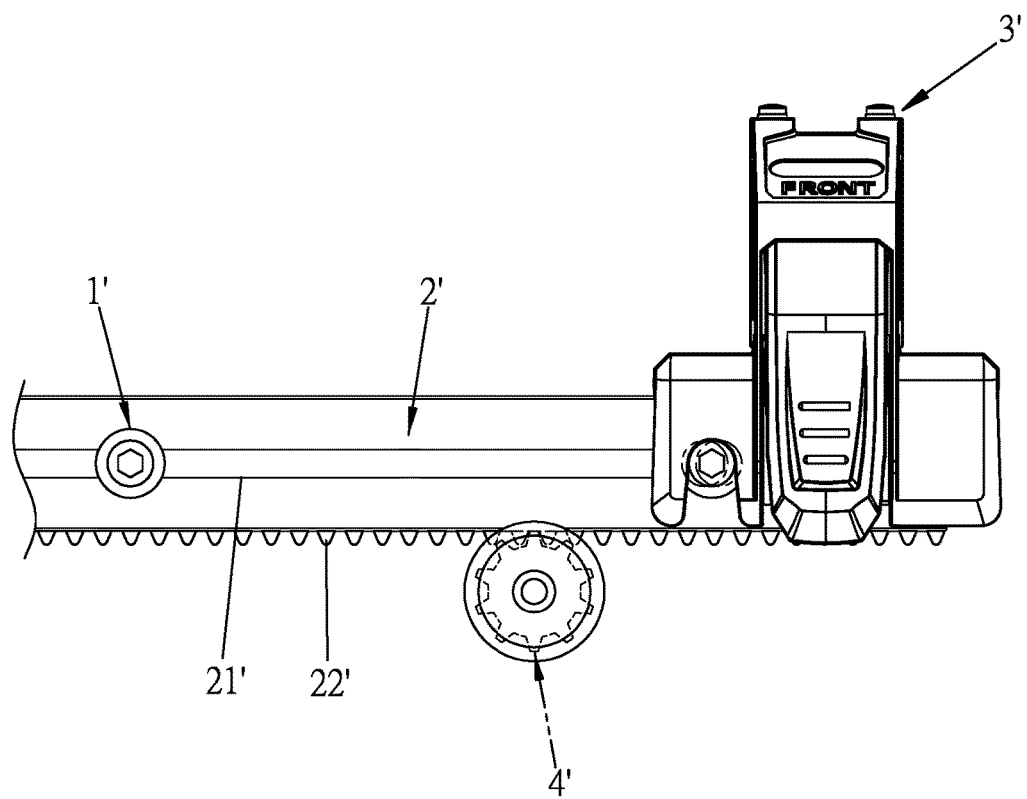
FIG. 3 is a side view of the conventional table saw.

Referring now to the drawings where like characteristics and features among the various figures are denoted by like reference characters.

Please refer to FIGS. 4 to 14, a table saw 100 may comprise a table 1, a saw 2, a track 3, a slide strip 4, and a fence member 5.

The table 1 may have an axial direction (the arrow X in FIG. 5) and a radial direction (the arrow Y in FIG. 5) which are orthogonal to each other.

The saw 2 may be arranged at a predetermined position, for example, the predetermined position is a center of the table 1. A cutting direction of the saw 2 and the radial direction of the table 1 are parallel.

The track 3 may be arranged at each side of the table 1. An axial direction of the track 3 and the axial direction of the table 1 are parallel.

Please refer to FIGS. 4, 5, 9, and 10, the slide strip 4 may be slidably engaged with the track 3. An outer surface of the slide strip 4 which is opposite to the track 3 has three position parts. The three position parts may be a first position part 41, a second position part 42, and a third position part 43. The first position part 41 and the second position part 42 are respectively arranged at two ends of the slide strip 4 and the third position part 43 is arranged at a center of the slide strip 4. Please refer to FIG. 6, an upper surface of the slide strip 4 may have scales 40.

Figure 6:
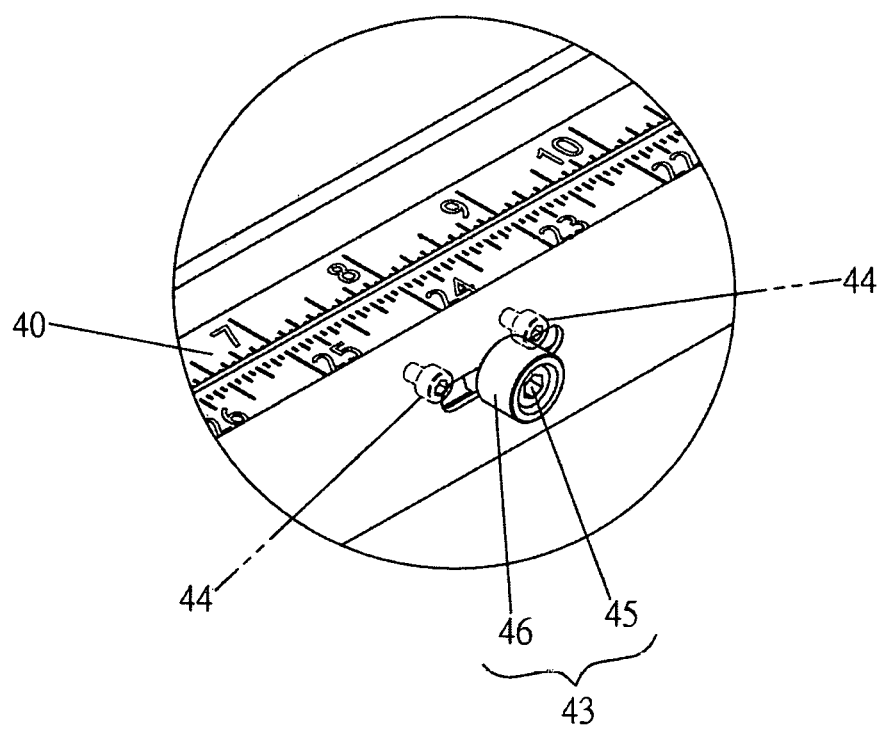
FIG. 6 is an enlarged view of one of the three position parts of the present invention.
Figure 7:
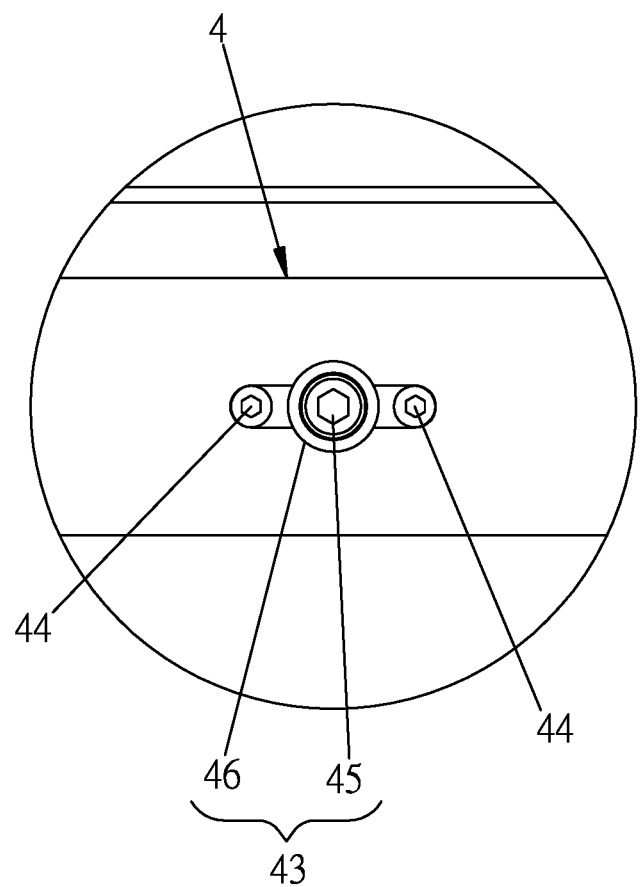
FIG. 7 is a side view of one of the three position parts of the present invention.
Figure 8:
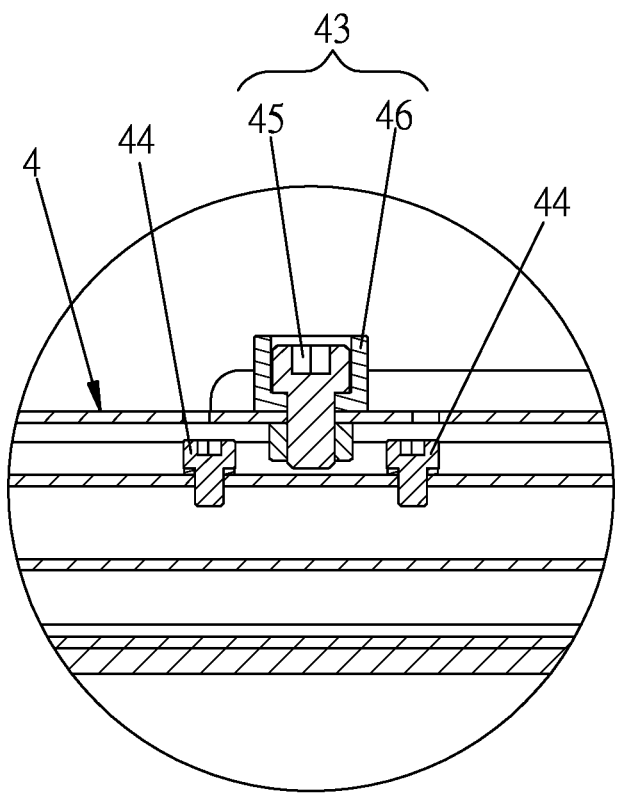
FIG. 8 is a cross-sectional view of one of the three position parts of the present invention.
Figure 9:
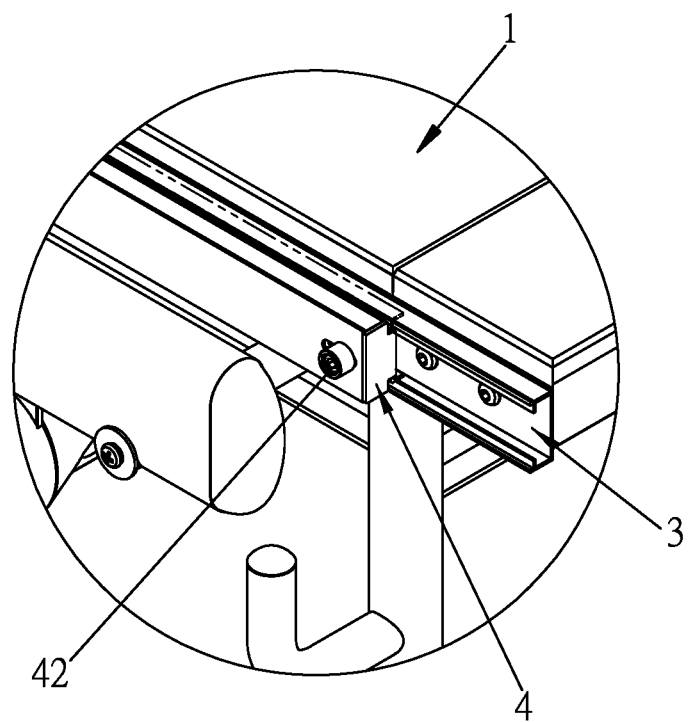
FIG. 9 is an enlarged view of the track and the slide strip of the present invention.
Figure 10:
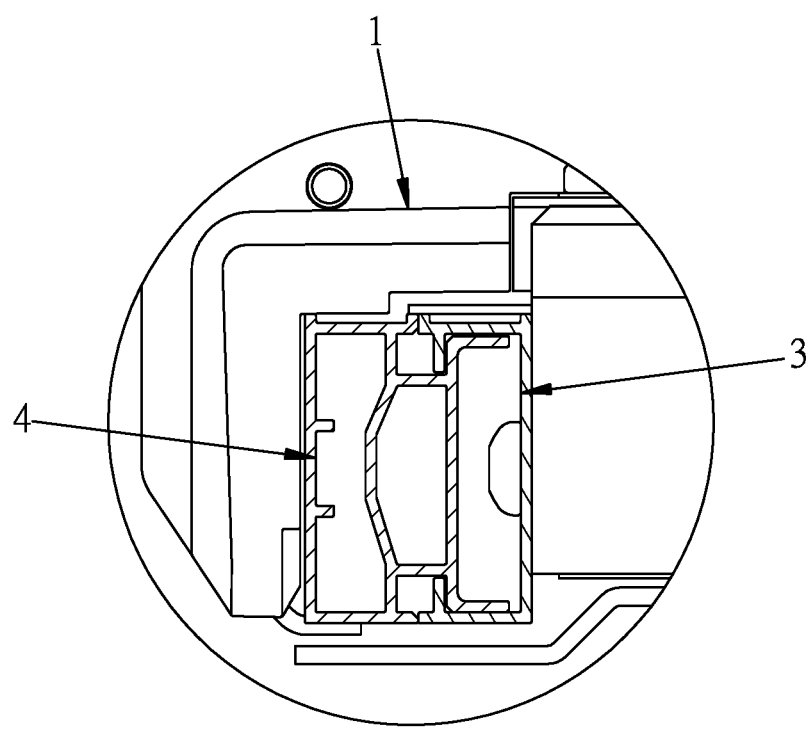
FIG. 10 is a cross-sectional view of the track and the slide strip of the present invention.

In addition, please refer to FIGS. 6 to 8, each of the first position part 41, the second position part 42, and the third position part 43 includes two fixing bolts 44, a free bolt 45, and a bushing 46. The free bolt 45 is arranged between the two fixing bolts 44 and limited by the two fixing bolts 44. The bushing 46 covers on the free bolt 45.

The fence member 5 may be bridged on the table 1 and lockably fixed at one of the three position parts (the first position part 41, the second position part 42, and the third position part 43).

Figure 4:
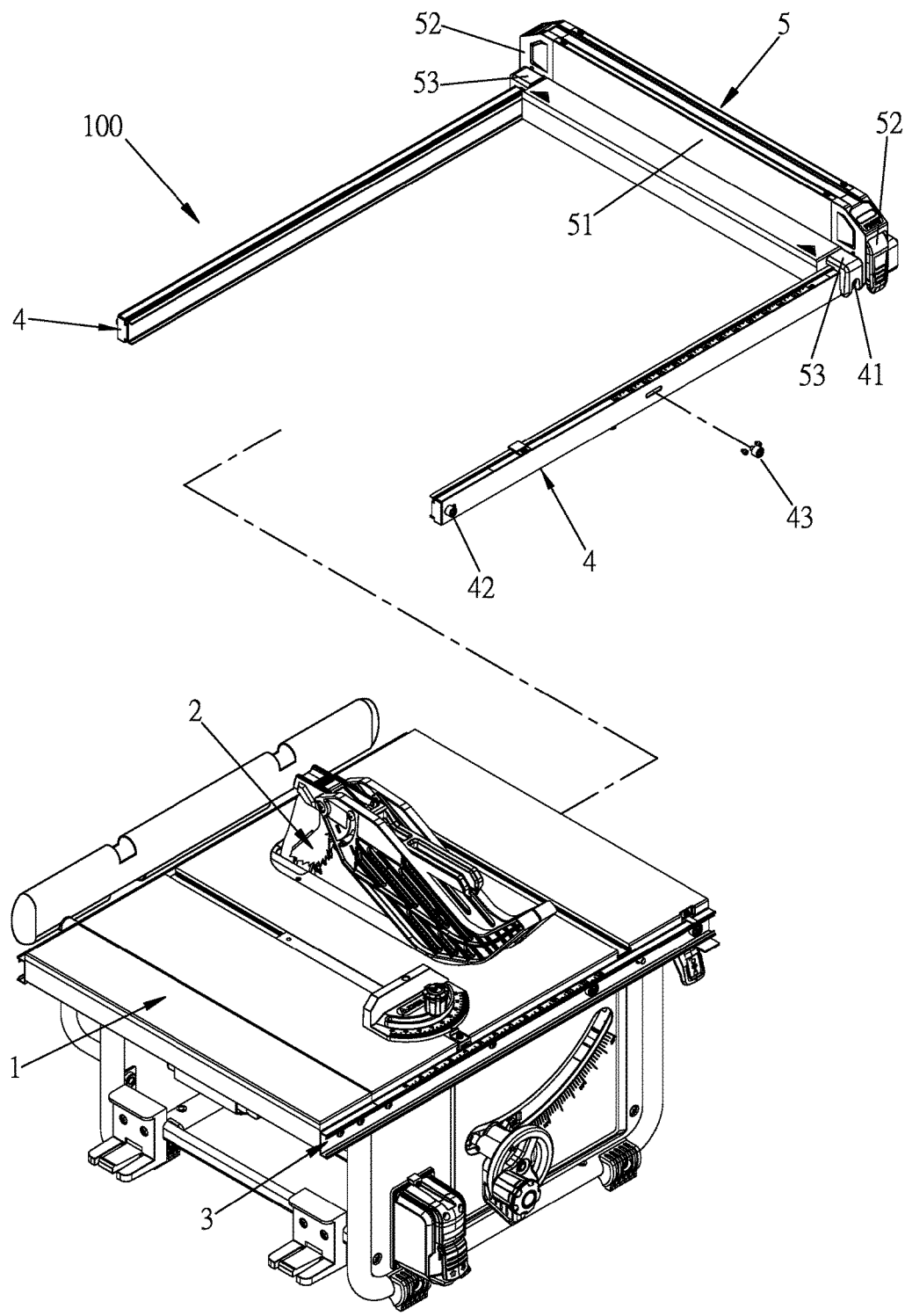
FIG. 4 is a partial exploded view of a table saw of the present invention.
Figure 5:
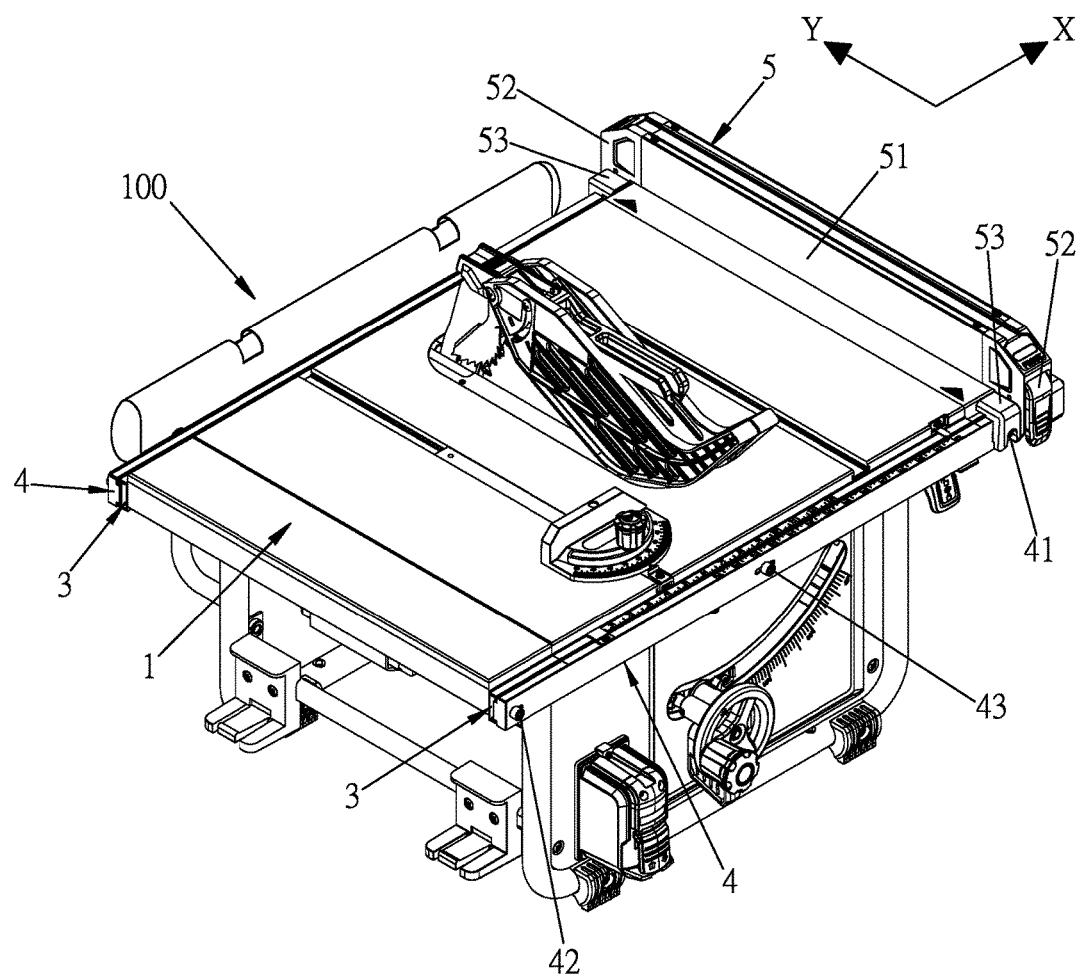
FIG. 5 is a perspective view of the table saw of the present invention.
Figure 11:
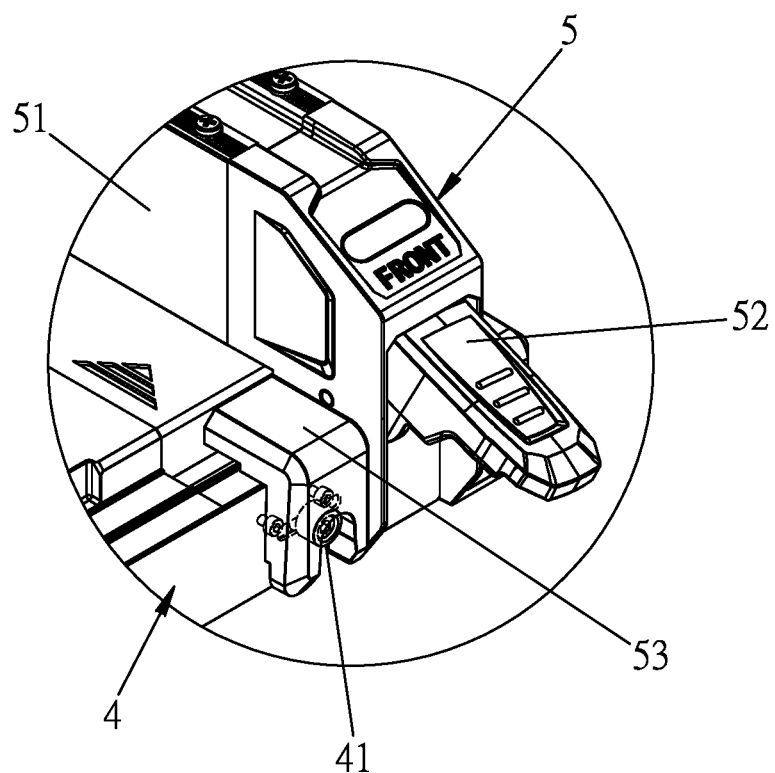
FIG. 11 is an enlarged view of the L-shaped locking part of the present invention.

Additionally, please refer to FIGS. 4, 5, and 11, the fence member 5 may include a bar part 51, two L-shaped locking parts 52, and two groove parts 53. The two L-shaped locking parts 52 are respectively arranged at two ends of the bar part 51. Each groove part 53 is arranged adjacent to corresponding L-shaped locking part 52. Each L-shaped locking part 52 is lockably fixed at the corresponding slide strip 4. Each groove part 53 is limited by the corresponding free bolt 45 of one of the first position part 41, the second position part 42, and the third position part 43.

Figure 12:
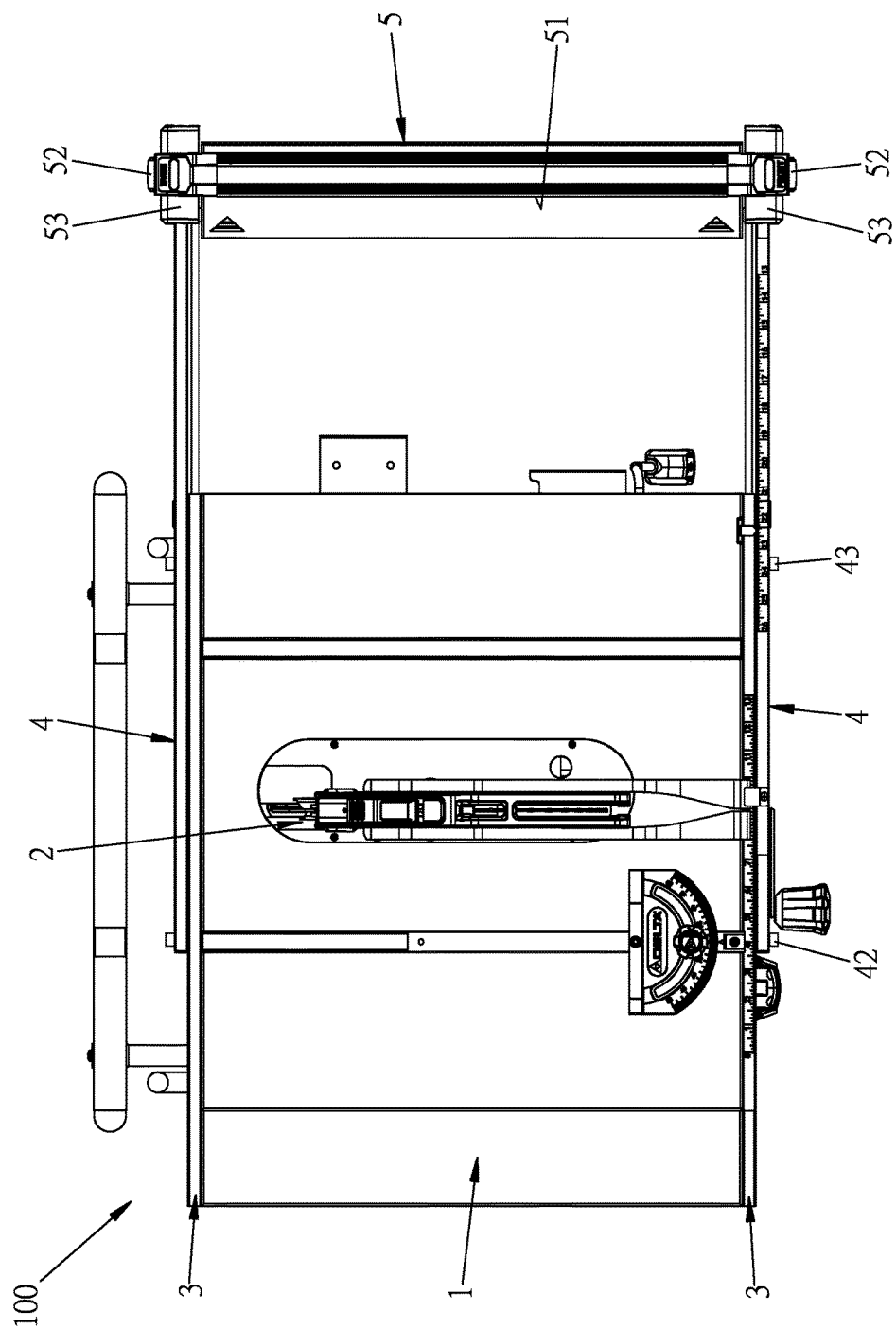
FIG. 12 is a plan view of the table of the present invention while the fence member is fixed at the first position part.

Please refer to FIG. 12, each groove parts 53 of the fence member 5 is respectively limited by the corresponding free bolt 45 of the first position part 41. At the same time, the slide strip 4 may be slid and moved relative to the track 3 to adjust a distance and a space between the saw 2 and the fence member 5 to align with the scales 40. The space between the saw 2 and the fence member 5 may place a work piece (not shown) which is ready to be cut and sized. And in this first embodiment, the size of the work piece may be large.

Figure 14:
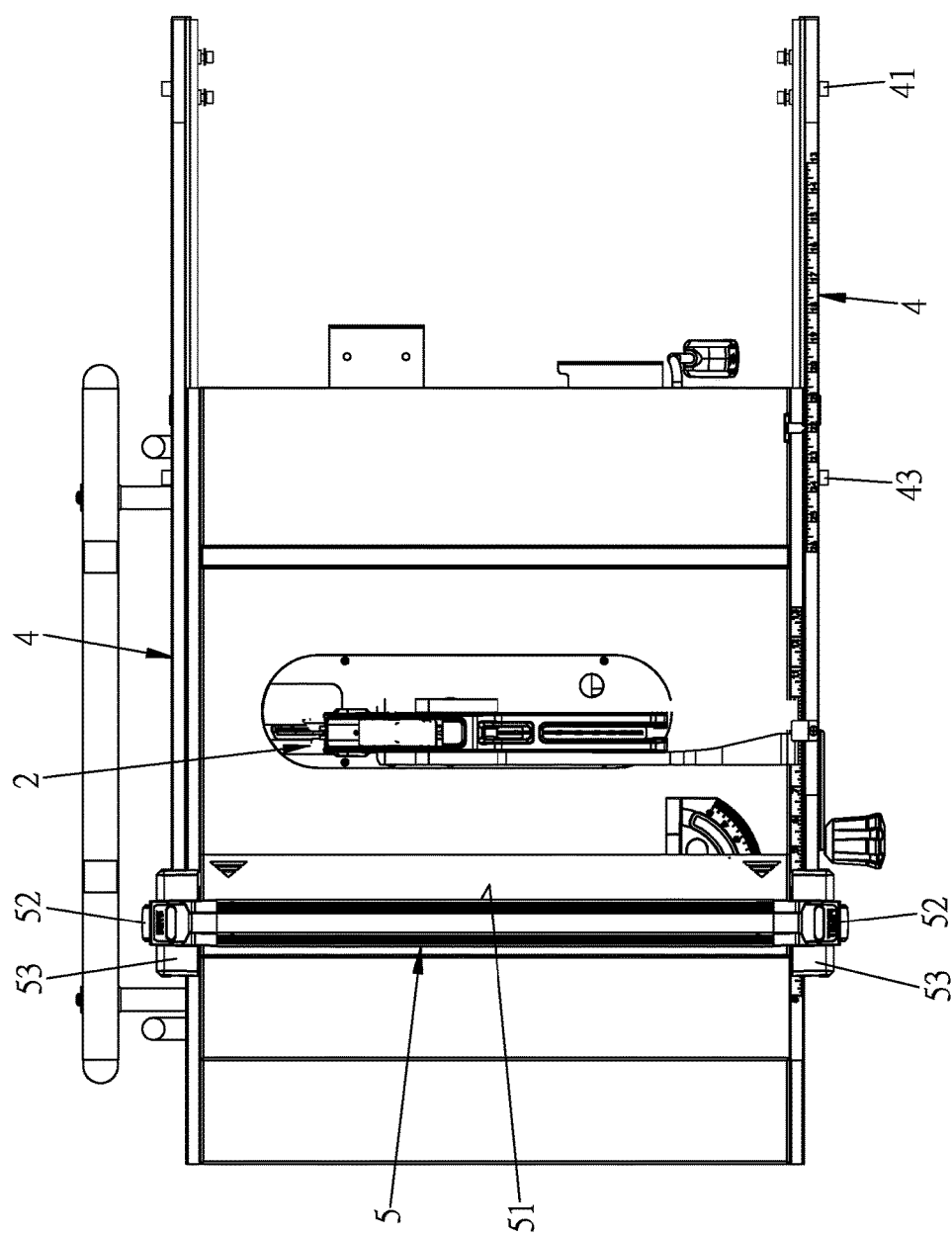
FIG. 14 is a plan view of the table of the present invention while the fence member is fixed at the second position part.

Please refer to FIG. 14, each groove parts 53 of the fence member 5 is respectively limited by the corresponding free bolt 45 of the second position part 42. At the same time, the slide strip 4 may be slid and moved relative to the track 3 to adjust a distance and a space between the saw 2 and the fence member 5 to align with the scales 40. The space between the saw 2 and the fence member 5 may place a work piece (not shown) which is ready to be cut and sized. And in this second embodiment, the size of the work piece may be smaller than the work piece of the first embodiment.

Figure 13:
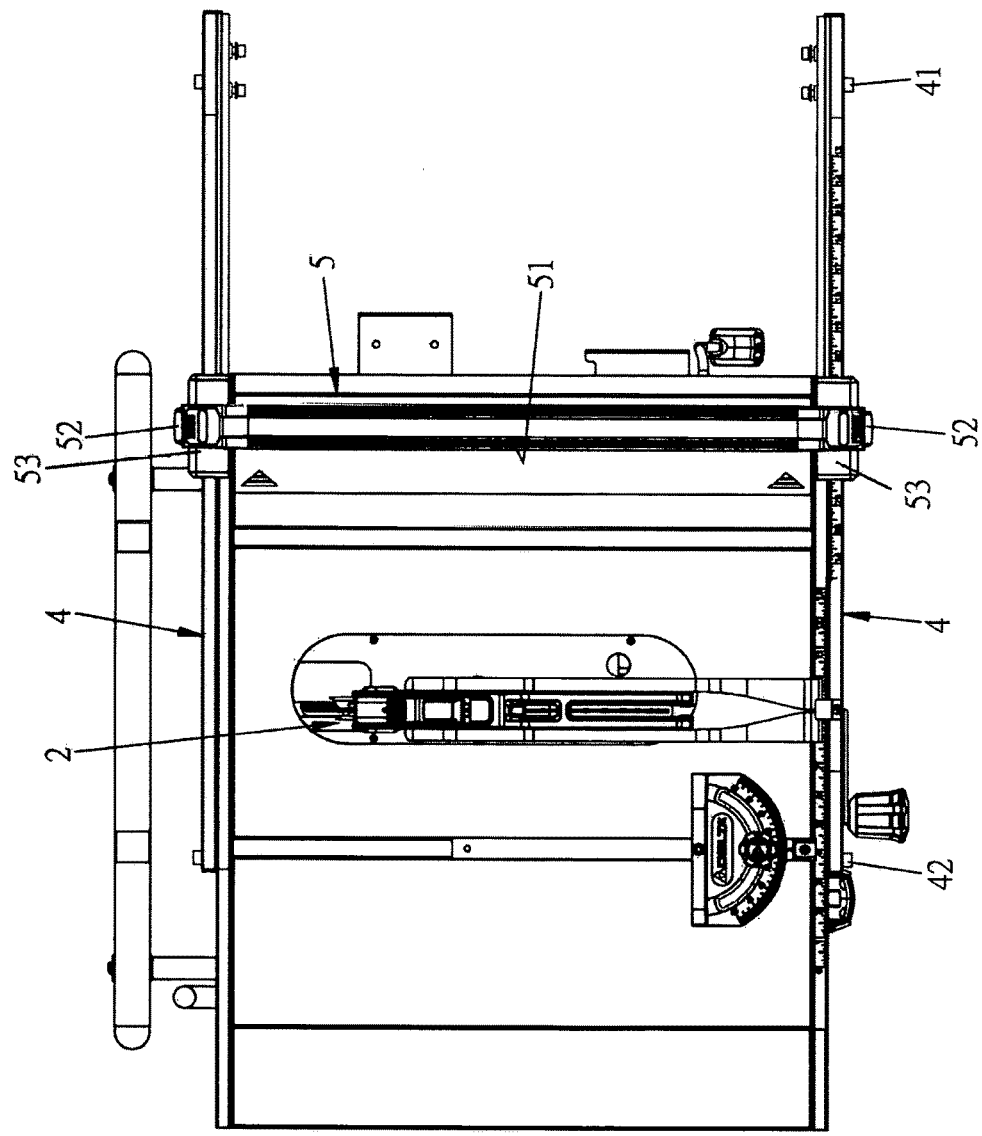
FIG. 13 is a plan view of the table of the present invention while the fence member is fixed at the third position part.

Please refer to FIG. 13, each groove parts 53 of the fence member 5 is respectively limited by the corresponding free bolt 45 of the third position part 43. At the same time, the slide strip 4 may be slid and moved relative to the track 3 to adjust a distance and a space between the saw 2 and the fence member 5 to align with the scales 40. The space between the saw 2 and the fence member 5 may place a work piece (not shown) which is ready to be cut and sized. And in this third embodiment, the size of the work piece may be smaller than the work piece of the second embodiment.

Therefore, according to above mentioned structure, the free bolt 45 covered with the bushing 46 is limited by the two fixing bolts 44 so that the free bolt 45 is hard to swing or vibrate. When each groove part 53 of the fence member 5 is engaged with and limited by the corresponding free bolt 45, the fence member 5 is stable to limit the work piece and the precision for cutting and sizing the work piece may be better.

The foregoing descriptions are merely the exemplified embodiments of the present invention, where the scope of the claim of the present invention is not intended to be limited by the embodiments. Any equivalent embodiments or modifications without departing from the spirit and scope of the present invention are therefore intended to be embraced.

The disclosed structure of the invention has not appeared in the prior art and features efficacy better than the prior structure which is construed to be a novel and creative invention, thereby filing the present application herein subject to the patent law.

What is claimed is:

1. A table saw, comprising:
    a table having an axial direction and a radial direction orthogonal to the axial direction;
    a saw arranged at a predetermined position of the table wherein a cutting direction of the saw is parallel to the radial direction of the table;
    a first one of a pair of tracks arranged at a first side of the table and a second one of the pair of tracks arranged at a second side of the table wherein an axial direction of one of the pair of tracks is parallel to the axial direction of the table;
    a slide strip slidably engaged with the one of the pair of tracks wherein an outer surface of the slide strip opposing the one of the pair of tracks has a first position part, a second position part, and a third position part, wherein the first position part and the second position part are respectively arranged at two ends of the slide strip, and wherein the third position part is arranged at a center of the slide strip; and
    a fence member bridged on the table and secured to one of the first position part, the second position part, and the third position part;
    wherein each of the first position part, the second position part, and the third position part includes two first bolts, a second bolt, and a bushing;
    wherein for each of the first position part, the second position part, and the third position part, the second bolt is arranged between the two first bolts and limited by the two first bolts, and the bushing covers the second bolt.

2. The table saw of claim 1, wherein the fence member includes a bar part, two L-shaped locking parts, and two groove parts, the two L-shaped locking parts are respectively arranged at two ends of the bar part, each groove part is arranged adjacent to a corresponding one of the L-shaped locking parts, and each L-shaped locking part is secured to the slide strip, and each groove part is limited by a corresponding one of the second bolts of one of the first position part, the second position part, and the third position part.

* * * * *